United States Patent
Lu et al.

(10) Patent No.: US 12,289,801 B2
(45) Date of Patent: Apr. 29, 2025

(54) SIDELINK CAPABILITY SENDING METHOD AND TERMINAL DEVICE

(71) Applicant: GUANGDONG OPPO MOBILE TELECOMMUNICATIONS CORP., LTD., Guangdong (CN)

(72) Inventors: Qianxi Lu, Guangdong (CN); Zhenshan Zhao, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 339 days.

(21) Appl. No.: 17/892,544

(22) Filed: Aug. 22, 2022

(65) Prior Publication Data
US 2022/0394461 A1 Dec. 8, 2022

Related U.S. Application Data

(63) Continuation of application No. PCT/CN2020/079790, filed on Mar. 17, 2020.

(51) Int. Cl.
*H04W 8/24* (2009.01)
*H04L 5/00* (2006.01)
*H04W 72/04* (2023.01)
*H04W 72/20* (2023.01)

(52) U.S. Cl.
CPC .......... *H04W 8/24* (2013.01); *H04L 5/0098* (2013.01); *H04W 72/20* (2023.01)

(58) Field of Classification Search
CPC .................. H04W 8/24; H04W 72/0406
See application file for complete search history.

(56) References Cited

U.S. PATENT DOCUMENTS

2019/0037448 A1 1/2019 Shan et al.
2019/0239112 A1 8/2019 Rao et al.
(Continued)

FOREIGN PATENT DOCUMENTS

CN 102291711 A 12/2011
CN 108366379 A 8/2018
(Continued)

OTHER PUBLICATIONS

New SID: Study on NR V2X,3GPP TSG RAN Meeting #80 RP-181429, La Jolla, USA; Jun. 11-14, 2018 (5 pages).
(Continued)

*Primary Examiner* — Derrick V Rose
(74) *Attorney, Agent, or Firm* — Young Basile Hanlon & MacFarlane, P.C.

(57) ABSTRACT

A sidelink capability sending method, a sidelink capability receiving method, and a terminal device are provided. The sidelink capability sending method includes generating, by a terminal device, a capability-reporting message, the capability-reporting message including capability information of the terminal device, and the capability information including at least one of: a combination of Long Term Evolution (LTE) PC5 frequency bands; a combination of New Radio (NR) PC5 frequency bands; and a combination of LTE PC5 frequency bands and NR-PC5 frequency bands; and sending, by the terminal device, the capability-reporting message. In this way, the capability information of the terminal may be reported.

20 Claims, 5 Drawing Sheets

(56) References Cited

U.S. PATENT DOCUMENTS

| | | | |
|---|---|---|---|
| 2019/0274121 A1 | 9/2019 | Wu et al. | |
| 2019/0289459 A1 | 9/2019 | Shan | |
| 2020/0359398 A1* | 11/2020 | Takahashi | H04W 16/32 |
| 2022/0174476 A1* | 6/2022 | Zhu | H04L 5/008 |
| 2023/0114413 A1* | 4/2023 | Kang | H04W 72/25 |
| | | | 455/452.1 |

FOREIGN PATENT DOCUMENTS

| | | |
|---|---|---|
| CN | 110089064 A | 8/2019 |
| CN | 110166976 A | 8/2019 |
| CN | 110351683 A | 10/2019 |
| CN | 116017414 A | 4/2023 |
| WO | 2019084800 A1 | 5/2019 |
| WO | 2019192534 A1 | 10/2019 |

OTHER PUBLICATIONS

International search report and Written Opinion with English Translation of PCT/CN2020/079790, mailed Nov. 25, 2020 (12 pages).

Extended European Search Report for EP Application 20925574.4 mailed Aug. 11, 2023. (7 pages).

International search report and Written Opinion of the International Search Authority with English Translation of PCT/CN2020/079790, mailed Nov. 25, 2020 (12 pages).

Extended European Search Report for EP Application 20925574.4 mailed Jan. 1, 2023. (10 pages).

3GPP TSG-RAN WG2 Meeting #109 electronic, R2-2000194, OPPO, Summary of [108#50][V2X] Feature List and UE caps (OPPO), Feb. 24-Mar. 6, 2020. (19 pages).

European Second Examination report for European Patent Application No. 20925574.4, mailed Jan. 18, 2024, 2 pages.

Chinese Request for Priority Examination of Patent Application and English translation for Chinese Application No. 2022115988827, mailed May 14, 2024, 5 pages.

Chinese First Office Action and English translation for Chinese Application No. 202211598882.7, mailed Jun. 4, 2024, 14 pages.

OPPO,"Summary of [108#50][V2X] Feature List and UE caps", 3GPP TSG-RAN WG2 Meeting #109 electronic, R2-2000194, Feb. 15, 2020, 19 pages.

Chinese Notification to Grant Patent Right for Invention and English Translation, Chinese Application No. 202211598882.7, mailed Aug. 14, 2024, 5 pages.

* cited by examiner

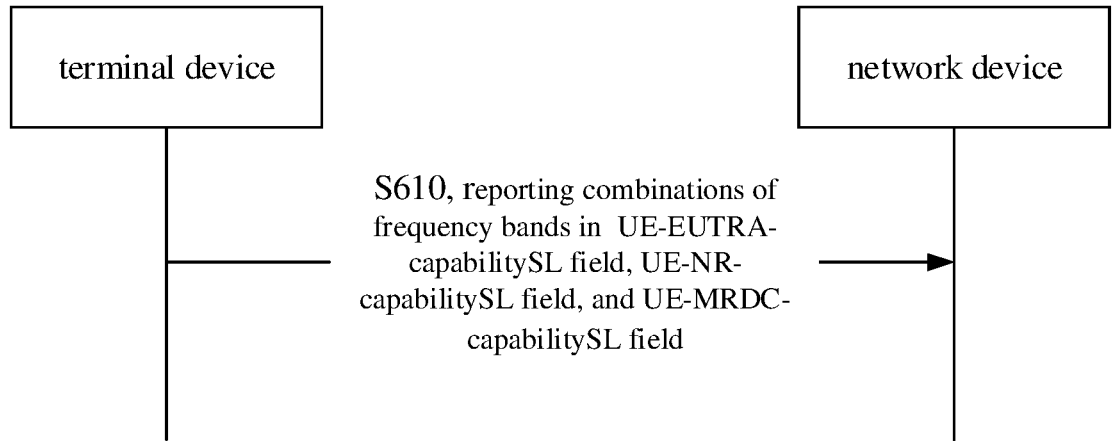

FIG. 6

700 receiving, by the network device, the capability-reporting message, the capability-reporting message including the capability information of the terminal device, the capability information including at least one of the combination of LTE PC5 frequency bands, the combination of NR PC5 frequency bands, and the combination of LTE PC5 frequency bands and NR PC5 frequency bands — S710

FIG. 7

SIDELINK CAPABILITY SENDING METHOD AND TERMINAL DEVICE

CROSS-REFERENCE TO RELATED APPLICATION(S)

The present application is a continuation of International (PCT) Patent Application No. PCT/CN2020/079790 filed on Mar. 17, 2020, the entire contents of which are hereby incorporated by reference in its entirety.

TECHNICAL FIELD

The present disclosure relates to a field of communications, and in particular to a sidelink capability sending method and a terminal device.

BACKGROUND

A D2D (Device-to-Device) communication is a SL (Sidelink) transmission technology, which is different from a manner of communication data being receiving or sending by a base station in a traditional cellular system. An IoV system adopts a manner of a terminal-to-terminal direct communication, such that a higher spectral efficiency and a lower transmission delay may be achieved. In a D2D communication system, a terminal device may be required to report capability information to a network side. In the related art, there is no specific reporting way for the capability information of the terminal device, in particular information such as frequency-band combination information in the capability information.

SUMMARY

A sidelink capability sending method and a terminal device, and a sidelink capability receiving method are provided in the embodiments of the present disclosure.

According to a first aspect of the embodiments of the present disclosure, a sidelink capability sending method is provided and includes generating, by a terminal device, a capability-reporting message, the capability-reporting message including capability information of the terminal device, and the capability information including at least one of a combination of Long Term Evolution (LTE) PC5 frequency bands; a combination of New Radio (NR) PC5 frequency bands; and a combination of LTE PC5 frequency bands and NR-PC5 frequency bands; and sending, by the terminal device, the capability-reporting message.

According to a second aspect of the embodiments of the present disclosure, a sidelink capability receiving method is provided and includes receiving, by a network device, a capability-reporting message; the capability-reporting message including capability information of a terminal device, and the capability information including at least one of a combination of LTE PC5 frequency bands; a combination of NR PC5 frequency bands; and a combination of LTE PC5 frequency bands and NR PC5 frequency bands.

According to a third aspect of the embodiments of the present disclosure, a terminal device is provided and includes a processor and a memory. The memory is configured to store a computer program. The processor is configured to call and run the computer program stored in the memory to implement the sidelink capability sending method.

BRIEF DESCRIPTION OF DRAWINGS

FIG. 6 is an implementation flowchart according to a fourth embodiment of the present disclosure.

FIG. 7 is an implementation flowchart of a sidelink capability receiving method 700 according to some embodiments of the present disclosure.

DETAILED DESCRIPTION

Figures 1, 2:
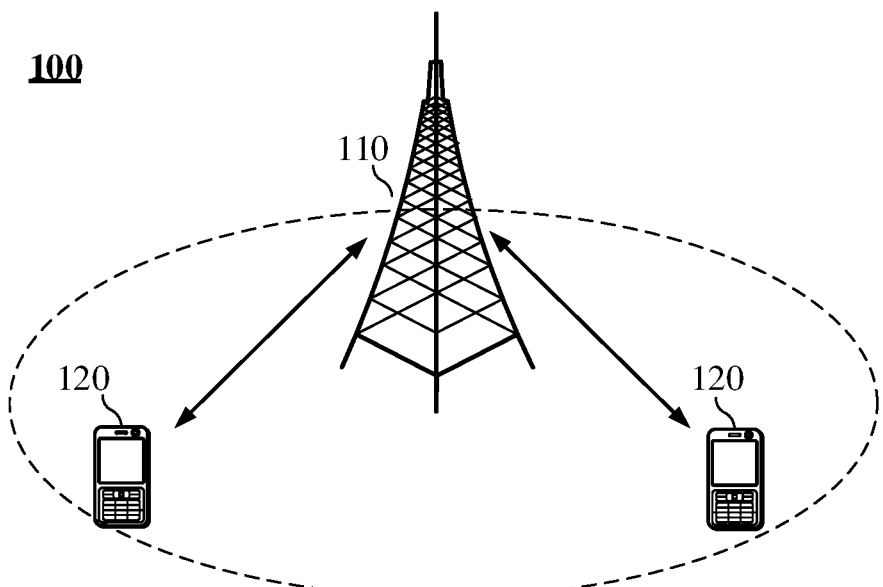
FIG. 1 is a schematic diagram of an application scenario according to some embodiments of the present disclosure.
FIG. 2 is an implementation flowchart of a sidelink capability sending method 200 according to some embodiments of the present disclosure.

Technical solutions in the embodiments of the present disclosure will be described in the following with reference to accompanying drawings in the embodiments of the present disclosure.

It should be noted that a term "first" and a term "second", etc., in specification and claims of the embodiments of the present disclosure and the accompanying drawings above are configured to distinguish similar objects, and are not necessarily configured for describing a specific order or a sequence. order. In addition, the objects described by the term "first" and the term "second", etc., may be the same or different.

The technical solutions of the embodiments of the present disclosure may be applied to various communication systems, for example, a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced long term evolution (LTE-A) system, a NR system, an evolution system of the NR system, a LTE-based access to unlicensed spectrum (LTE-U), a NR-based access to unlicensed spectrum (NR-U) system, a Universal Mobile Telecommunication System (UMTS), a Wireless Local Area Networks (WLAN), a Wireless Fidelity (WiFi), a 5th-Generation (5G) system, or other communication systems, etc.

In general, connections supported by a traditional communication system have a limited number and are easy to achieve. However, with a communication technology developing, a mobile communication system may not only support traditional communications, but also support, for example, the D2D communication, a Machine to Machine (M2M) communication, a Machine Type Communication (MTC), and a Vehicle to Vehicle (V2V) communication, etc. The embodiments of the present disclosure may also be applied to these communication systems.

In some embodiments, a communication system in the embodiments of the present disclosure may be applied to a CA (Carrier Aggregation,) scenario, a DC (Dual Connectivity) scenario, or a SA (Standalone) network-deploying scenario.

A spectrum applied is not limited in the embodiments of the present disclosure. For example, the embodiments of the present disclosure may be applied to a licensed spectrum, or may also be applied to an unlicensed spectrum.

Each embodiment is described in the embodiments of present disclosure in conjunction with a network device and a terminal device. The terminal device may also be referred to as a User Equipment (UE), an access terminal, a user unit, a user station, a mobile station, a mobile platform, a remote station, a remote terminal, a mobile device, a user terminal, a terminal, a wireless communication device, a user agent, or a user device, etc. The terminal device may be a STAION (ST) in the WLAN, a cellular phone, a cordless phone, a Session Initiation Protocol (SIP) phone, a Wireless Local Loop (WLL) station, a Personal Digital Assistant (PDA) device, a handheld device having wireless communication functions, a computing device, or other processing devices connected to a wireless modem, an in-vehicle device, a wearable device, and a next-generation communication system, for example, the terminal device in a NR network or the terminal device in an evolving-in-future Public Land Mobile Network (PLMN).

For an example but not a limitation, in the embodiments of the present disclosure, the terminal device may also be the wearable device. The wearable device may also be referred to as a wearable smart device, which is a general term for the wearable device developed through performing an intelligent design for a daily wear by adopting a wearable technology, such as glasses, gloves, watches, clothing, and shoes. The wearable device is a portable device which is worn directly on a body or integrated into the clothing or accessories. The wearable device is not only a hardware device, but also configured to implement powerful functions through a software support, a data interaction, and a cloud interaction. The wearable smart device in a broad sense may include devices which have complete functions and a large size, and may implement full or a part of the functions without relying on a smart phone, such as smart watches or smart glasses; and devices which may only focus on a certain type of application function and are required to be used cooperating with other devices for example, smart phones, such as all kinds of smart bracelets, smart jewelry, etc. for physical body-sign monitoring.

The network device may be a device configured to communicate with the mobile device. The network device may be an Access Point (AP) and the GSM in the WLAN, or a Base Transceiver Station (BTS) in the CDMA, or a NodeB (NB) in the WCDMA, or an eNB or Evolutional Node B (eNodeB) in the LTE, or a relay station, or the AP, or the in-vehicle device, the wearable device, and a gNB in the NR network, or the network device in the evolving-in-future PLMN, and the like.

In the embodiments of the present disclosure, the network device may provide services for a cell. The terminal device may communicate with the network device through transmission resources (for example, frequency domain resources, i.e., spectrum resources) used by the cell. The cell may be a cell corresponding to the network device (e.g., the base station). The cell may belong to a macro base station, or belong to a base station corresponding to a small cell. The small cell herein may include a Metro cell, a Micro cell, a Pico cell, a Femto cell, etc. These small cells have such characteristics of a small coverage and a low transmit power that the small cells are suitable for providing a high-speed data-transmitting service.

FIG. 1 exemplarily shows a network device 110 and two terminal devices 120. In some embodiments, a wireless communication system 100 may include multiple of network devices 110. A covering range of each network device 110 may include other numbers of terminal devices 120, which will not be limited in the embodiments of the present disclosure. The embodiments of the present disclosure may be applied to a terminal device 120 and a network device 110, or may also be applied to a terminal device 120 and another terminal device 120.

In some embodiments, the wireless communication system 100 may further include other network entities such as a Mobility Management Entity (MME), an Access and Mobility Management Function (AMF), which will not be limited in the embodiments of the present disclosure.

It should be understood that the term "system" and the term "network" may be often used interchangeably herein. The term "and/or" herein is only an association relationship for describing associated objects, indicating three relationships may exist. For example, A and/or B, may mean three cases that A exists alone, A and B exist simultaneously, and B exists alone. In addition, a character "/" herein generally indicates a "or" relationship between an object before the character "I" and a related object behind the character "I".

A SL capability sending method is provided in the embodiments of the present disclosure. A SL is a new link introduced to support direct communications between devices, and may also be referring to as a straight-through link. The SL may support the direct communications between UEs. FIG. 2 is an implementation flowchart of a sidelink capability sending method 200 according to some embodiments of the present disclosure, including the following operations.

At block S210, generating, by a terminal device, a capability-reporting message, the capability-reporting message including capability information of the terminal device, and the capability information including at least one of a combination of LTE PC5 frequency bands, a combination of NR PC5 frequency bands, and a combination of LTE PC5 frequency bands and NR PC5 frequency bands.

At block S220, sending, by the terminal device, the capability-reporting message.

In some embodiments, the combination of LTE PC5 frequency bands may refer to that frequency bands of LTE PC5 interfaces may be combined to operate together. The combination of NR PC5 frequency bands may refer to that frequency bands of NR PC5 interfaces may be combined to operate together. The combination of LTE PC5 frequency bands and NR PC5 frequency bands may refer to that the frequency bands of LTE PC5 interfaces and the frequency bands of NR PC5 interfaces may be combined to operate together.

For a UE, a frequency-band combination may include, for RAN4, defining radio-frequency parameters such as a bandwidth level, a power level, and a bandwidth combination set. For RAN4, physical layer parameters such as a multi-antenna parameter set (mimo), a modulation and demodulation parameter set, and a basic parameter set are defined. The basic parameter set may include a subcarrier-space parameter.

In some embodiments, the capability information may further include at least one of a capability of an LTE-Uu interface, a capability of an NR-Uu interface, and a capability of a dual connection of the LTE-Uu interface and the NR-Uu interface.

In some embodiments, the combination of LTE PC5 frequency bands may be carried in at least one way of being carried in a UE-NR-capability field, being carried in a UE-EUTRA-capability field, and being carried in a first field which is different from the UE-NR-capability field and the UE-EUTRA-capability field.

These fields may also be referred to as a container.

In some embodiments, a new field (or container) may be defined. For example, a UE-EUTRA-CapabilitySL field is defined, and the UE-EUTRA-CapabilitySL field is configured to carry the combination of LTE PC5 frequency bands.

In some embodiments, the combination of NR PC5 frequency bands may be carried in at least one way of being carried in the UE-NR-capability field, being carried in the UE-EUTRA-capability field, and being carried in a second field which is different from the UE-NR-capability field and the UE-EUTRA-capability field.

In some embodiments, the new field (or container) may be defined. For example, a UE-NR-CapabilitySL field is defined, and the UE-NR-CapabilitySL field is configured to carry the combination of NR PC5 frequency bands.

In some embodiments, the combination of LTE PC5 frequency bands and NR PC5 frequency bands may be carried in at least one way of being carried in the UE-NR-capability field, being carried in the UE-EUTRA-capability field, and being carried in a UE-MRDC (Multi-Radio Dual Connectivity)-capability field, and being carried in a third field which is different from the UE-NR-capability field, the UE-EUTRA-capability field, and the a UE-MRDC-capability field.

In some embodiments, the capability-reporting message may include at least one field of the UE-NR-capability field, the UE-EUTRA-capability field, the UE-MRDC-capability field, and an extension field.

The extension field is a field different from the UE-NR-capability field, the UE-EUTRA-capability field, and the UE-MRDC-capability field.

A field in the capability-reporting message is configured to carry the capability information of the terminal device.

In some embodiments, in response to the capability information including the combination of LTE PC5 frequency bands and NR PC5 frequency bands, the capability-reporting message is configured to indicate the capability information in at least one way of the following.

In a first way, the capability-reporting message indicates a combination of LTE PC5 frequency bands and NR PC5 frequency bands which is supported by the terminal device.

For example, the capability-reporting message includes each combination of LTE PC5 frequency bands and NR PC5 frequency bands.

For example, combination I may include a frequency band 1, a frequency band 2, a frequency band A, and a frequency band B. The frequency band 1 and the frequency band 2 are frequency bands of the LTE PC5 interface, and the frequency band A and the frequency band B are frequency bands of the NR PC5 interface.

Combination II may include a frequency band 3, a frequency band 4, a frequency band 5, a frequency band C, and a frequency band D. The frequency band 3, the frequency band 4, and the frequency band 5 are frequency bands of the LTE PC5 interface, and the frequency band C and frequency band D are frequency bands of the NR PC5 interface.

The capability-reporting message may include the combination of LTE PC5 frequency bands and NR PC5 frequency bands supported by the terminal device. For example, the capability-reporting message may include an identifier of each frequency band in each frequency-band combination, so as to explicitly indicate the combination of LTE PC5 frequency bands and NR PC5 frequency bands supported by the terminal device.

In a second way, for each combination of LTE PC5 frequency bands, the capability-reporting message indicates whether the terminal device supports a combination of LTE PC5 frequency bands and NR PC5 frequency bands which includes the each combination of LTE PC5 frequency bands and each combination of NR PC5 frequency bands.

For example, the terminal device may support 100 combinations of LTE PC5 frequency bands, including from a frequency-band combination 1 to a frequency-band combination 100. The terminal device may also support 100 combinations of NR PC5 frequency bands, including a frequency-band combination 1' to a frequency-band combination 100'.

Thus, the capability-reporting message may include 10,000 bits. Bits 1 to 100 may correspond to a frequency-band combination 1. Specifically, the 100 bits may respectively indicate whether the frequency-band combination 1 supports being combined with frequency-band combinations 1' to 100' to be combinations of LTE PC5 frequency bands and NR PC5 frequency bands. Bits 101 to 200 may correspond to a frequency-band combination 2. Specifically, the 100 bits may respectively indicate whether the frequency-band combination 2 supports being combined with frequency-band combinations 101' to 200' to be combinations of LTE PC5 frequency bands and NR PC5 frequency bands. Et cetera. Table 1 below shows an example of an indicating relationship between each bit in the capability-reporting message and the combination of LTE PC5 frequency bands and NR PC5 frequency bands.

TABLE 1

| Bit | Frequency-band | Frequency-band |
|---|---|---|
| Bit 1 | Frequency-band combination 1 (combination of LTE PC5 frequency bands) | Frequency-band combination 1' (combination of NR PC5 frequency bands) |
| Bit 2 | | Frequency-band combination 2' (combination of NR PC5 frequency bands) |
| . . . | | . . . |
| Bit 100 | | Frequency-band combination 100' (combination of NR PC5 frequency bands) |
| Bit 101 | Frequency-band combination 2 (combination of LTE PC5 frequency bands) | Frequency-band combination 1' (combination of NR PC5 frequency bands) |
| Bit 102 | | Frequency-band combination 2' (combination of NR PC5 frequency bands) |
| . . . | | . . . |
| Bit 200 | | Frequency-band combination 100' (combination of NR PC5 frequency bands) |
| . . . | . . . | |
| Bit 9901 | Frequency-band combination 100 (combination of LTE PC5 frequency bands) . . . | Frequency-band combination 1' (combination of NR PC5 frequency bands) |

TABLE 1-continued

| | |
|---|---|
| Bit 9902 | Frequency-band combination 2' (combination of NR PC5 frequency bands) |
| ... | ... |
| Bit 10000 | Frequency-band combination 100' (combination of NR PC5 frequency bands) |

Taking the above Table 1 as an example, when a value of bit 1 is 1, it may be indicated that the terminal device supports the combination of LTE PC5 frequency bands and NR PC5 frequency bands including the frequency-band combination 1 and the frequency-band combination 1'. When the value of bit 1 is 0, it may be indicated that the terminal device does not support the combination of LTE PC5 frequency bands and NR PC5 frequency bands including the frequency-band combination 1 and the frequency-band combination 1'. Et cetera.

In a third way, for each combination of NR PC5 frequency bands, the capability-reporting message indicates whether the terminal device supports a combination of LTE PC5 frequency bands and NR PC5 frequency bands which includes the each combination of the NR PC5 frequency bands and each combination of the LTE PC5 frequency bands.

For example, the terminal device may support 100 combinations of LTE PC5 frequency bands, including from the frequency-band combination 1 to the frequency-band combination 100. The terminal device may also support 100 combinations of NR PC5 frequency bands, including the frequency-band combination 1' to the frequency-band combination 100'.

Thus, the capability-reporting message may include 10,000 bits. Bits 1 to 100 may correspond to the frequency-band combination 1'. Specifically, the 100 bits may respectively indicate whether the frequency-band combination 1' supports being combined with frequency-band combinations 1 to 100 to be combinations of LTE PC5 frequency bands and NR PC5 frequency bands. Bits 101 to 200 may correspond to a frequency-band combination 2'. Specifically, the 100 bits may respectively indicate whether the frequency-band combination 2' supports being combined with frequency-band combinations 101 to 200 to be combinations of LTE PC5 frequency bands and NR PC5 frequency bands. Et cetera. Table 2 below shows an example of the indicating relationship between each bit in the capability-reporting message and the combination of LTE PC5 frequency bands and NR PC5 frequency bands.

TABLE 2

| | | |
|---|---|---|
| Bit 1 | Frequency-band combination 1' (combination of NR PC5 frequency bands) | Frequency-band combination 1 (combination of LTE PC5 frequency bands) |
| Bit 2 | | Frequency-band combination 2 (combination of LTE PC5 frequency bands) |
| ... | | ... |
| Bit 100 | | Frequency-band combination 100 (combination of LTE PC5 frequency bands) |
| Bit 101 | Frequency-band combination 2' (combination of NR PC5 frequency bands) | Frequency-band combination 1 (combination of LTE PC5 frequency bands) |
| Bit 102 | | Frequency-band combination 2 (combination of LTE PC5 frequency bands) |
| ... | | ... |
| Bit 200 | | Frequency-band combination 100 (combination of LTE PC5 frequency bands) |
| ... | ... | ... |
| Bit 9901 | Frequency-band combination 100' (combination of NR PC5 frequency bands) ... | Frequency-band combination 1 (combination of LTE PC5 frequency bands) |
| Bit 9902 | | Frequency-band combination 2 (combination of LTE PC5 frequency bands) |
| ... | | ... |
| Bit 10000 | | Frequency-band combination 100 (combination of LTE PC5 frequency bands) |

In a fourth way, for each combination of LTE PC5 frequency bands and NR PC5 frequency bands, the capability-reporting message indicates whether the terminal device supports the each combination of LTE PC5 frequency bands and NR PC5 frequency bands.

The fourth way is similar to the second way and the third way. Each bit corresponds to a possible combination of LTE PC5 frequency bands and NR PC5 frequency bands. One of two values of each bit represent that the terminal device supports the combination of LTE PC5 frequency bands and NR PC5 frequency bands corresponding to the bit. The other of the two values of the each bit represent that the terminal device does not support the combination of LTE PC5 frequency bands and NR PC5 frequency bands corresponding to the bit.

In some embodiments, the terminal device may determine a carrying manner based on carrying manner indication information. In some embodiments, the carrying manner indication information may include at least one of a first indication configured to indicate a carrying manner of the combination of LTE PC5 frequency bands, a second indication configured to indicate a carrying manner of the combination of NR PC5 frequency bands, and a third indication configured to indicate a carrying manner of the combination of LTE PC5 frequency bands and LTE PC5 frequency bands.

The first indication, the second indication, and the third indication may be in the same instruction, or may be in different instructions.

In some embodiments, the carrying manner indication information includes an indicator of RAT (Radio Access Type)-RequestList in UE-capability.

In some embodiments, the carrying manner indication information includes a value related to rat-Type and/or a value related to mrdc (multi-radio access type dual connectivity)-Request.

In some embodiments, the method may further include the terminal receiving an indication for reporting the capability information of the terminal device, for example, an indication of reporting LTE capability information, an indication of reporting NR capability information, and an indication of reporting LTE and NR DC capability information.

The terminal device may send the capability-reporting message to the network device. The capability-reporting message may include different fields which are configured to carry various frequency bands supported by the terminal device. Furthermore, the terminal device may also adopt the fields to carry the LTE capability information, the NR capability information, or the LTE and NR DC capability information required to be reported by the network device.

Some specific ways of sending the capability-reporting message are described in the following.

In some embodiments, the terminal device sending the capability-reporting message includes the following.

The terminal device sends the capability-reporting message. The capability-reporting message may include the UE-NR-capability field. The UE-NR-capability field may carry a capability of an LTE-Uu interface and at least one of the combination of LTE PC5 frequency bands, the combination of NR-PC5 frequency bands, and the combination of LTE PC5 frequency bands and NR PC5 frequency bands.

In some embodiments, the method may further include the terminal device receiving an indication of reporting the capability information of LTE.

In some embodiments, the terminal device may determine whether the capability-reporting massage includes the UE-EUTRA-Capability field based on a fourth indication.

Embodiment 1

Figure 3:
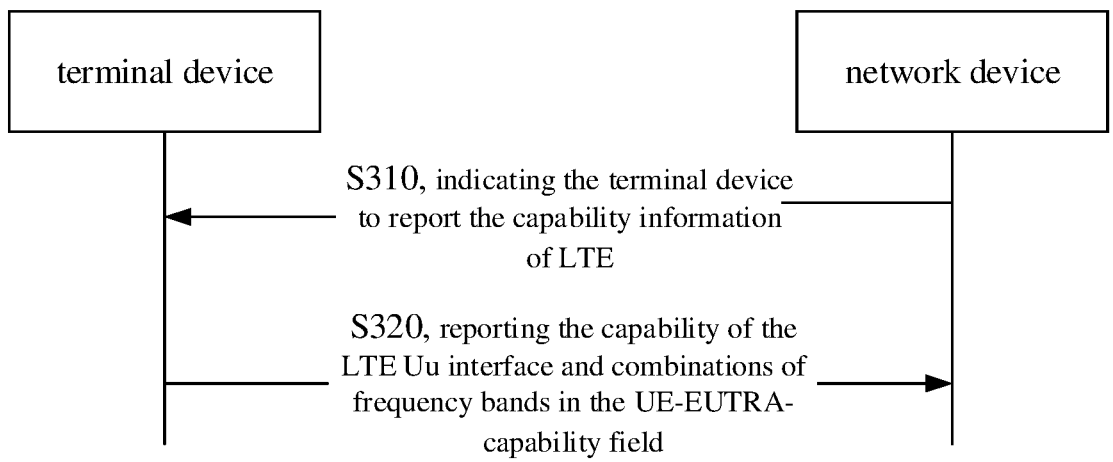
FIG. 3 is an implementation flowchart according to a first embodiment of the present disclosure.

FIG. 3 is an implementation flowchart according to a first embodiment of the present disclosure. As shown in FIG. 3, the present embodiment may include the following operations.

At block S310, indicating, by the network device, the terminal device to report the capability information of LTE.

At block S320, reporting, by the terminal device, the capability of the LTE-Uu interface and at least one of the combination of LTE PC5 frequency bands, the combination of NR-PC5 frequency bands, and the combination of LTE PC5 frequency bands and NR PC5 frequency bands in the UE-EUTRA-capability field.

In some embodiments, an indicating manner of the combination of LTE PC5 frequency bands and NR PC5 frequency bands may include at least one of the following.

Explicitly indicating the combination of LTE PC5 frequency bands and NR PC5 frequency bands supported by the terminal device.

For each combination of LTE PC5 frequency bands, indicating whether the terminal device supports each combination of NR PC5 frequency bands simultaneously.

For each combination of NR PC5 frequency bands, indicating whether the terminal device supports each combination of LTE PC5 frequency bands simultaneously.

For each possible combination of LTE PC5 frequency bands and NR PC5 frequency bands, indicating whether the terminal device supports the possible combination of LTE PC5 frequency bands and NR PC5 frequency bands.

In addition, before the block S320, the network device may further send a fourth indication to the terminal device. The fourth indication is configured to indicate whether the terminal device reports the UE-EUTRA-Capability field. In response to not reporting the UE-EUTRA-Capability field, the terminal device may adopt other fields to report various frequency-band combination information.

In some embodiments, the terminal device sending the capability-reporting message may include the following.

The terminal device sends the capability-reporting message. The capability-reporting message may include the UE-NR-capability field. The UE-NR-capability field may carry a capability of an NR-Uu interface and at least one of the combination of LTE PC5 frequency bands, the combination of NR-PC5 frequency bands, and the combination of LTE PC5 frequency bands and NR PC5 frequency bands.

In some embodiments, the method may further include the terminal device receiving an indication of reporting the capability information of NR.

In some embodiments, the terminal device may determine whether the capability-reporting massage includes the UE-NR-Capability field based on a fifth indication.

Embodiment 2

Figure 4:
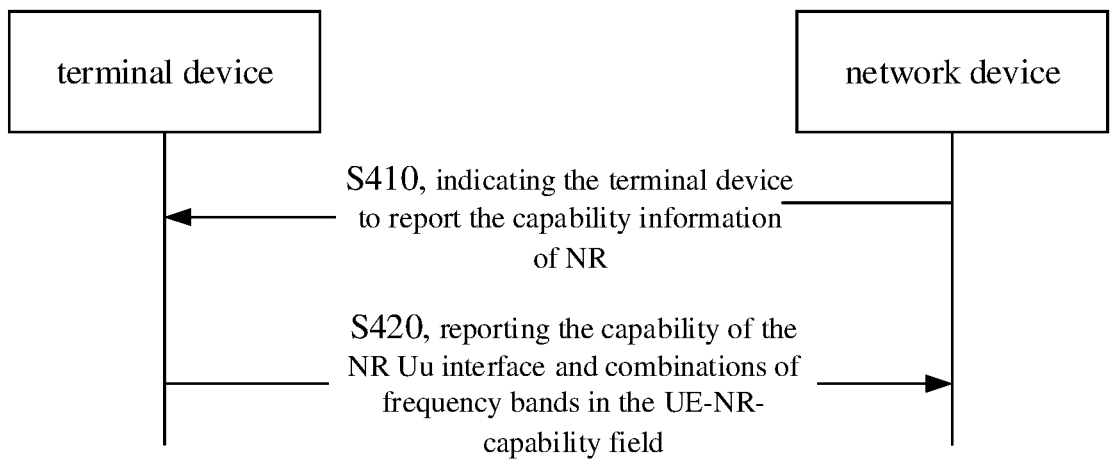
FIG. 4 is an implementation flowchart according to a second embodiment of the present disclosure.

FIG. 4 is an implementation flowchart according to a second embodiment of the present disclosure. As shown in FIG. 4, the present embodiment may include the following operations.

At block S410, indicating, by the network device, the terminal device to report the capability information of NR.

At block S420, reporting, by the terminal device, the capability of the NR-Uu interface and at least one of the combination of LTE PC5 frequency bands, the combination of NR-PC5 frequency bands, and the combination of LTE PC5 frequency bands and NR PC5 frequency bands in the UE-NR-capability field.

In some embodiments, the indicating manner of the combination of LTE PC5 frequency bands and NR PC5 frequency bands may include at least one of the following.

Explicitly indicating the combination of LTE PC5 frequency bands and NR PC5 frequency bands supported by the terminal device.

For each combination of LTE PC5 frequency bands, indicating whether the terminal device supports each combination of NR PC5 frequency bands simultaneously.

For each combination of NR PC5 frequency bands, indicating whether the terminal device supports each combination of LTE PC5 frequency bands simultaneously.

For each possible combination of LTE PC5 frequency bands and NR PC5 frequency bands, indicating whether the terminal device supports the possible combination of LTE PC5 frequency bands and NR PC5 frequency bands.

In addition, before the block S420, the network device may further send a fifth indication to the terminal device. The fifth indication is configured to indicate whether the terminal device reports the UE-NR-capability field. In response to not reporting the UE-NR-capability field, the terminal device may adopt other fields to report various frequency-band combination information.

In some embodiments, the terminal device sending the capability-reporting message may include the following.

The terminal device sends the capability-reporting message. The capability-reporting message may include at least one of the UE-EUTRA-capability field, the UE-NR-capability field, and the UE-MRDC-capability field.

The UE-EUTRA-capability field may be configured to carry the combination of LTE PC5 frequency bands.

The UE-NR-capability field may be configured to carry the combination of NR PC5 frequency bands.

The UE-MRDC-capability may be configured to carry the combination of NR PC5 frequency bands and LTE PC5 frequency bands.

In some embodiments, the method may further include the terminal device receiving an indication of reporting capability information of a DC of LTE and NR.

In some embodiments, the UE-EUTRA-capability may further carry the capability of the LTE-Uu interface.

The UE-NR-capability may further carry the capability of the NR-Uu interface.

The UE-MRDC-capability may further carry the capability of the DC of the LTE-Uu interface and the NR-Uu interface.

In some embodiments, the terminal device may determine whether the capability-reporting massage includes the UE-EUTRA-Capability field based on a sixth indication.

In some embodiments, the terminal device may determine whether the capability-reporting massage includes the UE-NR-capability field based on a seventh indication.

In some embodiments, the terminal device may determine whether the capability-reporting massage includes the UE-MRDC-capability field based on an eighth indication.

Embodiment 3

Figure 5:
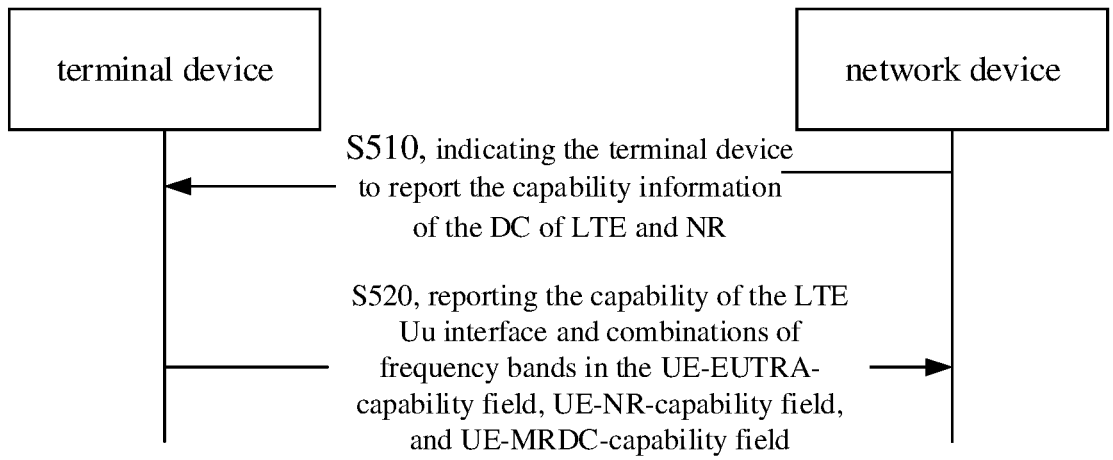
FIG. 5 is an implementation flowchart according to a third embodiment of the present disclosure.

FIG. 5 is an implementation flowchart according to a third embodiment of the present disclosure. As shown in FIG. 5, the present embodiment may include the following operations.

At block S510, indicating, by the network device, the terminal device to report the capability information of the DC of LTE and NR.

At block S520, reporting, by the terminal device, the capability of the LTE-Uu interface in the UE-EUTRA-capability field, reporting the capability of the NR-Uu interface in the UE-NR-capability field, and reporting the capability of the DC of the LTE-Uu interface and the NR-Uu interface in the UE-MRDC-Capability field. The terminal device may further report at least one of the following.

Reporting the combination of LTE PC5 frequency bands in the UE-EUTRA-capability field.

Reporting the combination of NR PC5 frequency bands in the UE-NR-capability field.

Reporting the combination of LTE PC5 frequency bands and NR PC5 frequency bands in the UE-MRDC-capability field.

In some embodiments, the indicating manner of the combination of LTE PC5 frequency bands and NR PC5 frequency bands may include at least one of the following.

Explicitly indicating the combination of LTE PC5 frequency bands and NR PC5 frequency bands supported by the terminal device.

For each combination of LTE PC5 frequency bands, indicating whether the terminal device supports each combination of NR PC5 frequency bands simultaneously.

For each combination of NR PC5 frequency bands, indicating whether the terminal device supports each combination of LTE PC5 frequency bands simultaneously.

For each possible combination of LTE PC5 frequency bands and NR PC5 frequency bands, indicating whether the terminal device supports the possible combination of LTE PC5 frequency bands and NR PC5 frequency bands.

In addition, before the block S520, the network device may further send a sixth indication, a seventh indication, and/or an eighth indication to the terminal device. The sixth indication is configured to indicate whether the terminal device reports the UE-EUTRA-Capability field. The seventh indication is configured to indicate whether the terminal device reports the UE-NR-Capability field. The eighth indication is configured to indicate whether the terminal device reports the UE-MRDC-Capability field. In response to not reporting a certain field above, the terminal device may adopt other fields to report corresponding frequency-band combination information.

In some embodiments, the terminal device sending the capability-reporting message includes the following.

The terminal device sends the capability-reporting message. The capability-reporting message may include at least one of a first field, a second field, and a third field. The first field, the second field, and the third field are fields different from the UE-NR-Capability field, the UE-EUTRA-Capability field, and the UE-MRDC-Capability field.

The first field is configured to carry the combination of LTE PC5 frequency bands.

The second field is configured to carry the combination of NR PC5 frequency bands.

The third field is configured to carry the combination of LTE PC5 frequency bands and NR PC5 frequency bands.

The first field, the second field, and the third field may be pre-defined new fields in the present embodiment.

In some embodiments, the terminal device may determine whether the capability-reporting massage includes the first field based on a ninth indication.

In some embodiments, the terminal device may determine whether the capability-reporting massage includes the second field based on a tenth indication.

In some embodiments, the terminal device may determine whether the capability-reporting massage includes the third field based on an eleventh indication. Embodiment 4.

FIG. 6 is an implementation flowchart according to a fourth embodiment of the present disclosure. As shown in FIG. 6, the present embodiment may include the following operations.

At block S610, the terminal reporting the combination of LTE PC5 frequency bands in a new field UE-EUTRA-CapabilitySL, reporting the combination of NR PC5 frequency bands in a new field UE-NR-CapabilitySL, and reporting the combination of LTE PC5 frequency bands and NR PC5 frequency bands in a new field UE-MRDC-CapabilitySL.

In some embodiments, the indicating manner of the combination of LTE PC5 frequency bands and NR PC5 frequency bands may include at least one of the following.

Explicitly indicating the combination of LTE PC5 frequency bands and NR PC5 frequency bands supported by the terminal device.

For each combination of LTE PC5 frequency bands, indicating whether the terminal device supports each combination of NR PC5 frequency bands simultaneously.

For each combination of NR PC5 frequency bands, indicating whether the terminal device supports each combination of LTE PC5 frequency bands simultaneously.

For each possible combination of LTE PC5 frequency bands and NR PC5 frequency bands, indicating whether the terminal device supports the possible combination of LTE PC5 frequency bands and NR PC5 frequency bands.

In addition, before the block S610, the network device may further send a ninth indication, a tenth indication, and/or an eleventh indication to the terminal device. The ninth indication is configured to indicate whether the terminal device reports the field UE-EUTRA-CapabilitySL. The tenth indication is configured to indicate whether the terminal device reports the field UE-NR-CapabilitySL. The eleventh indication is configured to indicate whether the terminal device reports the field UE-MRDC-CapabilitySL. In response to not reporting a certain field above, the terminal device may adopt other fields to report corresponding frequency-band combination information.

It should be noted that, the first field, the second field, and third field may be the same field, or may be different fields. In addition, indications from the first indication to the eleventh indication may adopt the same indication message, or may adopt different indication messages.

A sidelink capability receiving method is provided in the embodiments of the present disclosure, and may be applied to the network device. FIG. 7 is an implementation flowchart of a sidelink capability receiving method 700 according to some embodiments of the present disclosure and includes the following operations.

At block 710, receiving, by the network device, the capability-reporting message. The capability-reporting message may include the capability information of the terminal device. The capability information may include at least one of the combination of LTE PC5 frequency bands, the combination of NR PC5 frequency bands, and the combination of LTE PC5 frequency bands and NR PC5 frequency bands.

In some embodiments, the capability-reporting message may further include at least one of the capability of an LTE-Uu interface, the capability of an NR-Uu interface, and the capability of the DC of the LTE-Uu interface and the NR-Uu interface.

In some embodiments, the capability-reporting message may include at least one field of the UE-NR-capability field, the UE-EUTRA-capability field, the UE-MRDC-capability field, and the extension field.

The extension field is a field different from the UE-NR-capability field, the UE-EUTRA-capability field, and the UE-MRDC-capability field.

A field in the capability-reporting message is configured to carry the capability information of the terminal device.

In some embodiments, in response to the capability information including the combination of LTE PC5 frequency bands and NR PC5 frequency bands, the capability-reporting message may be configured to indicate the capability information in at least one way of the following.

The capability-reporting message may indicate the combination of LTE PC5 frequency bands and NR PC5 frequency bands which is supported by the terminal device.

For each combination of LTE PC5 frequency bands, the capability-reporting message may indicate whether the terminal device supports a combination of LTE PC5 frequency bands and NR PC5 frequency bands which includes the each combination of LTE PC5 frequency bands and each combination of NR PC5 frequency bands.

For each combination of NR PC5 frequency bands, the capability-reporting message may indicate whether the terminal device supports a combination of LTE PC5 frequency bands and NR PC5 frequency bands which includes the each combination of the NR PC5 frequency bands and each combination of the LTE PC5 frequency bands.

For each combination of LTE PC5 frequency bands and NR PC5 frequency bands, the capability-reporting message may indicate whether the terminal device supports the each combination of LTE PC5 frequency bands and NR PC5 frequency bands.

In some embodiments, the method may further include sending, by the network device, carrying manner indication information, the carrying manner indication information being configured to indicate a carrying manner for the capability information of the terminal device and including at least one of a first indication, a second indication, and a third indication.

The first indication is configured to indicate a carrying manner of the combination of LTE PC5 frequency bands.

The second indication is configured to indicate a carrying manner of the combination of NR PC5 frequency bands.

The third indication is configured to indicate a carrying manner of the combination of LTE PC5 frequency bands and LTE PC5 frequency bands.

In some embodiments, the carrying manner indication information may include an indicator of RAT-RequestList in UE-capability.

In some embodiments, the carrying manner indication information may include a value related to rat-Type and/or a value related to mrdc-Request.

In some embodiments, the method may further include sending, by the network device, an indication for reporting the capability information of the terminal device.

Figure 8:
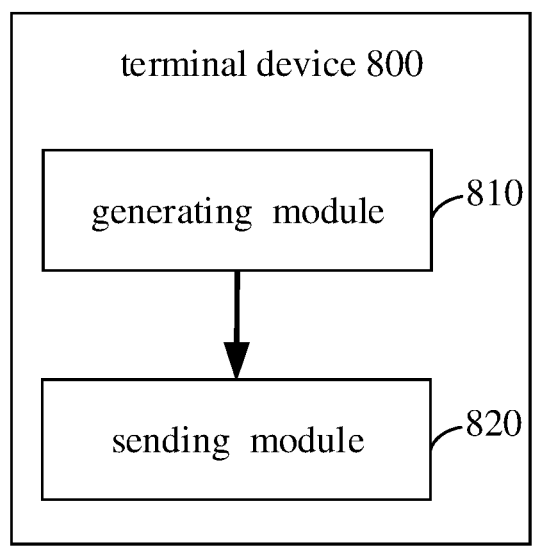
FIG. 8 is a structural schematic view of a terminal device 800 according to some embodiments of the present disclosure.

A terminal device is provided in the embodiments of the present disclosure. FIG. 8 is a structural schematic view of a terminal device 800 according to some embodiments of the present disclosure. The terminal may include the following.

A generating module 810, configured to generate a capability-reporting message. The capability-reporting message may include the capability information of the terminal device, and the capability information may include at least one of the combination of LTE PC5 frequency bands, the combination of NR PC5 frequency band, and the combination of LTE PC5 frequency bands and NR PC5 frequency bands.

A sending module 820, configured to send the capability-reporting message.

In some embodiments, the capability information may further include at least one of the capability of the LTE-Uu interface, the capability of the NR-Uu interface, and the capability of the DC of the LTE-Uu interface and the NR-Uu interface.

In some embodiments, the capability-reporting message may include at least one field of the UE-NR-capability field, the UE-EUTRA-capability field, the UE-MRDC-capability field, and the extension field.

The extension field is a field different from the UE-NR-capability field, the UE-EUTRA-capability field, and the UE-MRDC-capability field.

The field in the capability-reporting message is configured to carry the capability information of the terminal device.

It should be understood that for concision, the above operations or other operations or functions of modules of the terminal device according to the embodiments of the present disclosure configured to implement a corresponding process of the terminal device in the method 200 in FIG. 2, will not be repeated herein.

Figure 9:
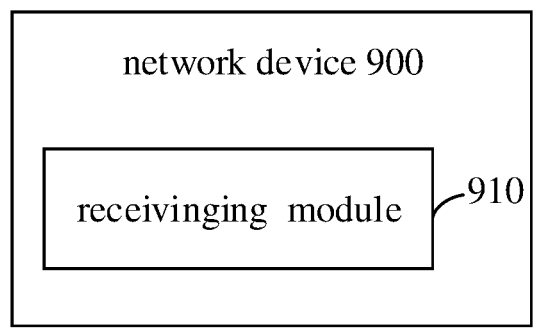
FIG. 9 is a structural schematic view of a network device 900 according to some embodiments of the present disclosure.

A network device is further provided in the embodiments of the present disclosure. FIG. 9 is a structural schematic view of a network device 900 according to some embodiments of the present disclosure. The network device may include the following.

A receiving module 910, configured to receive a capability-reporting message, the capability-reporting message including capability information of the terminal device, and the capability information including at least one of a combination of LTE PC5 frequency bands; a combination of NR PC5 frequency bands; and a combination of LTE-PC5 frequency bands and NR-PC5 frequency bands.

In some embodiments, the capability information may further include at least one of a capability of an LTE-Uu interface, a capability of a NR-Uu interface, and a capability of a DC of the LTE-Uu interface and the NR-Uu interface.

In some embodiments, the capability-reporting message may include at least one field of a UE-NR-capability field, a UE-EUTRA-capability field, a UE-MRDC-capability field, and an extension field.

The extension field is a field different from the UE-NR-capability field, the UE-EUTRA-capability field, and the UE-MRDC-capability field.

A field in the capability-reporting message is configured to carry the capability information of the terminal device.

It should be understood that for concision, the above operations or other operations or functions of modules of the network device according to the embodiments of the present disclosure configured to implement a corresponding process of the network device in the method 700 in FIG. 7, will not be repeated herein.

Figure 10:
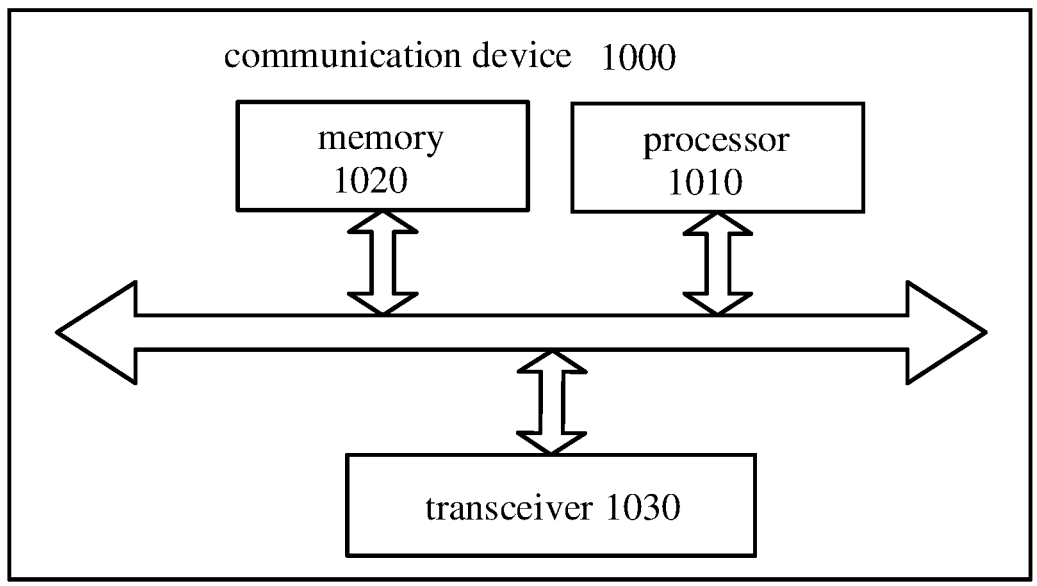
FIG. 10 is a structural schematic view of a communication device 1000 according to some embodiments of the present disclosure.

FIG. 10 is a structural schematic view of a communication device 1000 according to some embodiments of the present disclosure. The communication device 1000 as shown in FIG. 10 may include a processor 1010. The processor 1010 may be configured to call a computer program from a memory and run the computer program to implement the method in the embodiments of the present disclosure.

In some embodiments, as shown in FIG. 10, the communication device 1000 may further include the memory 1020. The processor 1010 may be configured to call and run the computer program from the memory 1020 to implement the method in the embodiments of the present disclosure.

The memory 1020 may be a separate device independent of the processor 1010, or may be integrated in the processor 1010.

In some embodiments, as shown in FIG. 10, the communication device 1000 may further include a transceiver 1030. The processor 1010 may be configured to control the transceiver 1030 to communicate with other devices. Specifically, the processor 1010 may be configured to control the transceiver 1030 to send information or data to other devices, or receive information or data sent by the other devices.

The transceiver 1030 may include a transmitter and a receiver. The transceiver 1030 may further include antennas, and the number of the antennas may be one or more.

In some embodiments, the communication device 1000 may be the terminal device 800 in the embodiments of the present disclosure. The terminal device 800 may implement a corresponding process implemented by the terminal device in each method of the embodiments of the present disclosure, which is not repeated herein for concision.

In some embodiments, the communication device 1000 may be the network device 900 in the embodiments of the present disclosure. The network device 900 may implement the corresponding process implemented by the network device in each method in the embodiments of the present disclosure, which is not repeated herein for concision.

Figure 11:
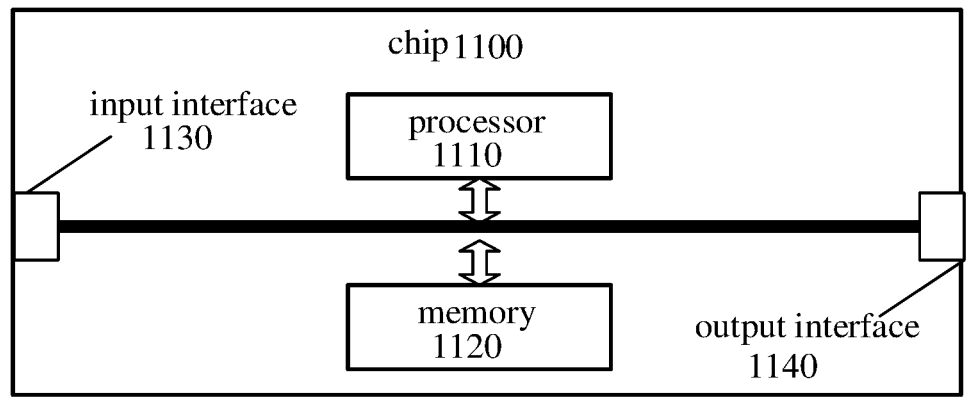
FIG. 11 is a structural schematic view of a chip 1100 according to some embodiments of the present disclosure.

FIG. 11 is a structural schematic view of a chip 1100 according to some embodiments of the present disclosure. The chip 1100 shown in FIG. 11 includes a processor 1110. The processor 1110 can call a computer program from a memory and run the computer program to implement the method in the embodiments of the present disclosure.

In some embodiments, as shown in FIG. 11, the chip 1100 may further include the memory 1120. The processor 1110 may call the computer program from the memory 1120 and run the computer program to implement the method in the embodiments of the present disclosure.

The memory 1120 may be a separate device independent of the processor 1110, or may be integrated in the processor 1110.

In some embodiments, the chip 1100 may further include an input interface 1130. The processor 1110 may control the input interface 1130 to communicate with other devices or chips. Specifically, the processor 1110 may control the input interface 1130 to acquire information or data sent by other devices or chips.

In some embodiments, the chip 1100 may further include an output interface 1140. The processor 1110 may be configured to control the output interface 1140 to communicate with the other devices or chips. Specifically, the processor 1110 may be configured to control the output interface 1140 to output information or data to the other devices or chips.

In some embodiments, the chip may be applied to the terminal device in the embodiments of the present disclosure, and implement the corresponding process implemented by the terminal device in each method of the embodiments of the present disclosure, which is not repeated herein for concision.

In some embodiments, the chip may be applied to the network device in the embodiments of the present disclosure, and implement the corresponding process implemented by the network device in each method of the embodiments of the present disclosure, which is not repeated herein for concision.

It should be understood that the chip described in the embodiments of the present disclosure may also be referred to as a system-on-chip, a system chip, a chip system, or system-on-chip chip, or the like.

The processor described above may be a general-purpose processor, a digital signal processor (DSP), a field programmable gate array (FPGA), an application specific integrated circuit (ASIC) or other programmable logic devices, a transistor logic device, a discrete hardware component, etc. In some embodiments, the general-purpose processor described above may be a microprocessor or any conventional processor, or the like.

The memory described above may be either a volatile memory or a non-volatile memory, or may include both the volatile memory and the non-volatile memory. The non-volatile memory may be a read-only memory (ROM), a programmable read-only memory (PROM), an erasable programmable read-only memory (EPROM), an electrically EPROM (EEPROM), or a flash memory. The volatile memory may be a random access memory (RAM).

It should be understood that above memories are exemplary but not limitative descriptions. For example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ES-DRAM), a synch link DRAM (SLDRAM), and a direct rambus RAM (DR RAM). ET cetera. That is, the memory in the embodiments of the present disclosure may be intended to include but not limited to these and any other suitable types of memories.

Figure 12:
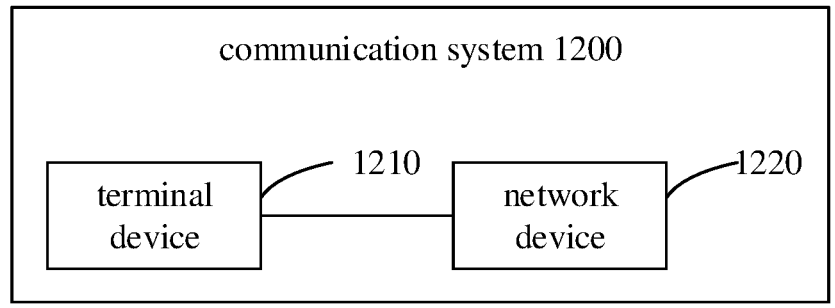
FIG. 12 is a structural schematic view of a communication system 1200 according to some embodiments of the present disclosure.

FIG. 12 is a structural schematic view of a communication system 1200 according to some embodiments of the present disclosure. As shown in FIG. 12, the communication system 1200 may include a terminal device 1210 and a network device 1220.

The terminal device 1210 is configured to generate the capability-reporting message. The capability-reporting message may include the capability information of the terminal device. The capability information may include at least one of the combination of LTE PC5 frequency bands, the combination of NR PC5 frequency bands, and the combination of LTE PC5 frequency bands and NR-PC5 frequency bands. The terminal device 1210 is also configured to send the capability-reporting message. The network device 1220 is configured to receive the capability-reporting message.

The terminal device 1210 may be configured to implement corresponding functions implemented by the terminal device in the method 200 described above. A structure of the terminal device 1210 may be as shown in the terminal device 800 in the above embodiments. The network device 1220 may be configured to implement the corresponding functions implemented by the network device in the method 700 described above. A structure of the network device 1220 may be as shown in the network device 900 in the above embodiment. For concision, details are not repeated herein.

In the above embodiments, it may be implemented in whole or in part by a software, a hardware, a firmware, or any combination thereof. When implemented by the software, it may be implemented in whole or in part in a form of a computer program product. The computer program product may include one or more computer instructions. When the computer program instructions are loaded and executed on a computer, all or part of the processes or functions described in the embodiments of the present disclosure may be generated. The computer may be a general purpose computer, a special purpose computer, a computer network, or other programmable devices. The computer instructions may be stored in a computer readable storage medium, or be transmitted from the computer readable storage medium to another computer readable storage medium. For example, the computer instructions may be transmitted from a website site, a computer, a server, or a data center by wire (e.g., a coaxial cable, an optical fiber, a Digital User Line (DSL)) or wireless (e.g., infrared, wireless, microwave, etc.) to another website site, another computer, another server, or another data center. The computer-readable storage medium may be any available medium that may be accessed by the computer, or a data storage device such as a server, a data center, etc. including one or more available media integrated. The available media may be magnetic media (e.g., floppy disks, hard disks, magnetic tapes), optical media (e.g., DVD), or semiconductor media (e.g., Solid State Disk (SSD)), and the like.

It should be understood that, in various embodiments of the present disclosure, a size of a sequence numbers of the above process does not mean an executing sequence. The executing sequence of each process should be determined based on its function and internal logic, and should be not understood as any limitation to an implementation process in the embodiments of the present disclosure.

Those skilled in the art may clearly understand that, for the convenience and brevity of descriptions, a specific operating process of the above system, a specific operating process of the device, and a specific operating process of the unit may refer to a corresponding process in the above method embodiments, which will not be repeated herein.

A protection scope of the present disclosure is not limited to the above descriptions which are only specific embodiments of the present disclosure. Within a technical scope of the present disclosure, any change or substitution easily obtained by a person skilled in the art who is familiar with the present technical field should be covered within the protection scope of the present disclosure. Therefore, the protection scope of the present disclosure shall be subject to a protection scope of the claims.

What is claimed is:

1. A sidelink capability sending method, comprising:
   generating, by a terminal device, a capability-reporting message, the capability-reporting message comprising capability information of the terminal device, and the capability information comprising at least one of:
   a combination of Long Term Evolution (LTE) PC5 frequency bands;
   a combination of New Radio (NR) PC5 frequency bands; or
   a combination of LTE PC5 frequency bands and NR PC5 frequency bands; and
   sending, by the terminal device, the capability-reporting message,
   wherein the combination of LTE PC5 frequency bands refers to that frequency bands of LTE PC5 interfaces are combined to operate together, the combination of NR PC5 frequency bands refers to that frequency bands of NR PC5 interfaces are combined to operate together, and the combination of LTE PC5 frequency bands and NR PC5 frequency bands refers to that the frequency bands of LTE PC5 interfaces and the frequency bands of NR PC5 interfaces are combined to operate together.

2. The method according to claim 1, wherein the capability information further comprises at least one of:
   a capability of an LTE-Uu interface,
   a capability of an NR-Uu interface, or
   a capability of a dual connection of the LTE-Uu interface and the NR-Uu interface.

3. The method according to claim 1, wherein the capability-reporting message comprises at least one field of:
   a UE-NR-capability field,
   a UE-EUTRA-capability field, or
   a UE-MRDC-capability field;
   wherein a field in the capability-reporting message is configured to carry the capability information of the terminal device.

4. The method according to claim 1, wherein in response to the capability information comprising the combination of LTE PC5 frequency bands and LTE PC5 frequency bands, the capability-reporting message is configured to indicate the capability information in the following way:
   the capability-reporting message indicating a combination of LTE PC5 frequency bands and LTE PC5 frequency bands which is supported by the terminal device.

5. The method according to claim 1, wherein the capability-reporting message comprises an identifier of each frequency band in each combination of frequency bands.

6. The method according to claim 1, further comprising:
   determining, by the terminal device, a carrying manner for the capability information of the terminal device based on carrying manner indication information;
   wherein the carrying manner indication information comprises at least one of a first indication, a second indication, or a third indication;
   wherein the first indication is configured to indicate a carrying manner of the combination of LTE PC5 frequency bands; the second indication is configured to indicate a carrying manner of the combination of NR PC5 frequency bands; and the third indication is configured to indicate a carrying manner of the combination of LTE PC5 frequency bands and LTE PC5 frequency bands.

7. The method according to claim 6, wherein the carrying manner indication information comprises an indicator of RAT (Radio Access Type)-RequestList in UE-capability.

8. The method according to claim 6, wherein the carrying manner indication information comprises a value related to rat-Type and/or a value related to mrdc (multi-radio access type dual connectivity)-Request.

9. The method according to claim 1, further comprising:
   receiving, by the terminal device, an indication for reporting the capability information of the terminal device.

10. A sidelink capability receiving method, comprising:
receiving, by a network device, a capability-reporting message; the capability-reporting message comprising capability information of a terminal device, and the capability information comprising at least one of:
a combination of LTE PC5 frequency bands;
a combination of NR PC5 frequency bands; or
a combination of LTE PC5 frequency bands and NR PC5 frequency bands,
wherein the combination of LTE PC5 frequency bands refers to that frequency bands of LTE PC5 interfaces are combined to operate together, the combination of NR PC5 frequency bands refers to that frequency bands of NR PC5 interfaces are combined to operate together, and the combination of LTE PC5 frequency bands and NR PC5 frequency bands refers to that the frequency bands of LTE PC5 interfaces and the frequency bands of NR PC5 interfaces are combined to operate together.

11. The method according to claim 10, wherein the capability information further comprises at least one of:
a capability of an LTE-Uu interface,
a capability of an NR-Uu interface, or
a capability of a dual connection of the LTE-Uu interface and the NR-Uu interface.

12. The method according to claim 10, the capability-reporting message comprises at least one field of:
a UE-NR-capability field,
a UE-EUTRA-capability field, or
a UE-MRDC-capability field;
wherein a field in the capability-reporting message is configured to carry the capability information of the terminal device.

13. The method according to claim 10, wherein in response to the capability information comprising the combination of LTE PC5 frequency bands and NR PC5 frequency bands, the capability-reporting message is configured to indicate the capability information in the following way:
the capability-reporting message indicating the combination of LTE PC5 frequency bands and NR PC5 frequency bands which is supported by the terminal device.

14. The method according to claim 10, wherein the capability-reporting message comprises an identifier of each frequency band in each combination of frequency-bands.

15. The method according to claim 10, further comprising:
sending, by the network device, carrying manner indication information, wherein the carrying manner indication information is configured to indicate a carrying manner for the capability information of the terminal device and comprises at least one of a first indication, a second indication, or a third indication;
wherein the first indication is configured to indicate a carrying manner of the combination of LTE PC5 frequency bands; the second indication is configured to indicate a carrying manner of the combination of NR PC5 frequency bands; and the third indication is configured to indicate a carrying manner of the combination of LTE PC5 frequency bands and LTE PC5 frequency bands.

16. The method according to claim 15, wherein the carrying manner indication information comprises an indicator of RAT-RequestList in UE-capability.

17. The method according to claim 15, wherein the carrying manner indication information comprises a value related to rat-Type and/or a value related to mrdc-Request.

18. The method according to claim 10, further comprising:
sending, by the network device, an indication for reporting the capability information of the terminal device.

19. A terminal device, comprising:
a processor; and
a memory, configured to store a computer program;
wherein the processor is configured to call and run the computer program stored in the memory, to implement:
generating a capability-reporting message, the capability-reporting message comprising capability information of the terminal device, and the capability information comprising at least one of:
a combination of Long Term Evolution (LTE) PC5 frequency bands;
a combination of New Radio (NR) PC5 frequency bands; or
a combination of LTE PC5 frequency bands and NR PC5 frequency bands; and
sending the capability-reporting message,
wherein the combination of LTE PC5 frequency bands refers to that frequency bands of LTE PC5 interfaces are combined to operate together, the combination of NR PC5 frequency bands refers to that frequency bands of NR PC5 interfaces are combined to operate together, and the combination of LTE PC5 frequency bands and NR PC5 frequency bands refers to that the frequency bands of LTE PC5 interfaces and the frequency bands of NR PC5 interfaces are combined to operate together.

20. The terminal device according to claim 19, wherein the capability information further comprises at least one of:
a capability of an LTE-Uu interface,
a capability of an NR-Uu interface, or
a capability of a dual connection of the LTE-Uu interface and the NR-Uu interface.

* * * * *